United States Patent Office 3,542,867
Patented Nov. 24, 1970

3,542,867
PRODUCTION OF N-3-OXOHYDROCARBON-SUBSTITUTED ACRYLAMIDES
Norbert J. Foecking, Chardon, Ohio, assignor to The Lubrizol Corporation, Wickliffe, Ohio, a corporation of Ohio
No Drawing. Filed Sept. 27, 1967, Ser. No. 671,141
Int. Cl. C07c 103/42
U.S. Cl. 260—561   5 Claims

ABSTRACT OF THE DISCLOSURE

N-3-oxohydrocarbon-substituted acrylamides, especially N-(1,1-dimethyl-3-oxobutyl)acrylamide, are recovered from a sulfuric acid-containing reaction mixture by diluting with water and extracting the product from the aqueous system with a water-immiscible solvent, preferably chloroform.

---

This invention relates to the production of N-3-oxohydrocarbon-substituted acrylamides, and more particuarly to a method for the isolation of said N-3-oxohydrocarbon-substituted acrylamides from the reaction mixtures in which they are produced. The invention is particularly applicable to methods for the preparation of compounds of the formula

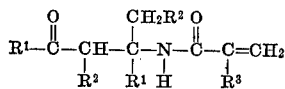

wherein $R^1$ is a hydrocarbon radical; $R^2$ is hydrogen or a hydrocarbon radical; and $R^3$ is hydrogen or a lower alkyl radical, by reaction of one mole of an unsaturated nitrile of the formula

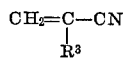

with at least about 1 mole of a β-hydroxy aldehyde or ketone or an α,β-unsaturated aldehyde or ketone of the respective formulas

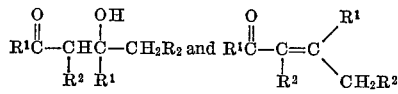

or with at least about two moles of an aldehyde or ketone of the formula

in the presence of at least one mole of sulfuric acid.

According to this invention, the N-3-oxohydrocarbon-substituted acrylamide is recovered by diluting the reaction mixture with water to a sulfuric acid content of about 80% or lower, the N-3-oxohydrocarbon-substituted acrylamide is extracted from the acidic reaction mixture with a water-immiscible organic solvent, and the desired product is recovered from the solution.

N-3-oxohydrocarbon-substituted acrylamides are described in U.S. Pat. 3,277,056. That patent also describes methods for their preparation by the reaction of an unsaturated nitrile with an aldehyde or ketone, or a dimeric self-condensation product thereof, in the presence of sulfuric acid. The products are useful as monomers for conversion to polymers having a number of interesting properties.

The reaction of the nitrile with the oxo compound (aldehyde, ketone or self-condensation product thereof) is best carried out under "plug flow" conditions—that is, under conditions where the reaction mixture passing by a given point in the system has attained a relatively constant stage of reaction completion, said stage of completion being roughly proportional to the distance the mixture at that point has traveled through the system. These conditions may be attained by carrying out the reaction in a series of vessels, the reaction mixture passing from one vessel to the next in continuous flow. The reaction may, if desired, be initiated in a suitable heat exchanger before passing into the first of said vessels.

When N-3-oxohydrocarbon-substituted acrylamides are prepared as described above, they must be isolated from a strongly acidic reaction mixture. In one method for isolation of the product, ice or an ice-water mixture is added, followed by sufficient basic reagent to neutralize substantially all of the sulfuric acid. Care is taken during this process to maintain the temperature below about 100° C., preferably about 0–70° C. The desired product may easily be recovered from this neutralized solution and may then, for example, be purified by recrystallization from a suitable solvent, or by a combination of distillation and recrystallization. For example, N-(1,1-dimethyl-3-oxobutyl)acrylamide may be obtained by reacting two moles of acetone with one mole of acrylonitrile in the presence of about two moles of sulfuric acid, diluting the reaction mixture with up to an equal weight of cold water, neutralizing with anhydrous ammonia, separating and drying the crude organic phase, and extracting this phase with warm n-heptane. Upon cooling the n-heptane solution, the pure N-(1,1-dimethyl-3-oxobutyl)acrylamide crystallizes and may be easily recovered.

While this method for recovery and purification of N-3-oxohycarbon-substituted acrylamides is effective, it is often not particularly convenient owing to the limited solubility of the product in the aliphatic hydrocarbon solvent, and the fact that the necessary neutralization of the reaction mixture is somewhat of a nuisance and destroys sulfuric acid which could otherwise be recovered and used again. Accordingly, new and improved methods for recovery of these compounds, which methods are convenient for industrial use on a commerical scale, are still being sought.

A principal object of the present invention, therefore, is to provide an improved method for the preparation of N-3-oxohydrocarbon-substituted acrylamides.

A further object is to provide convenient and economical methods for the recovery and purification of N-3-oxohydrocarbon-substituted acrylamides from their reaction mixtures.

Other objects will in part be obvious and will in part appear hereinafter.

For the sake of convenience, and because N-(1,1-dimethyl-3-oxobutyl)acrylamide (diacetone acrylamide) is the compound of greatest current interest, the remainder of this specification will deal with this compound. It is to be understood, however, that the method is equally applicable to other N-3-oxohydrocarbon-substituted acrylamides, such as N-(1,3-diphenyl-1-methyl-3-oxopropyl)acrylamide and N-(1-methyl-1-ethyl-3-oxopentyl)acrylamide.

According to the method of this invention, the reaction mixture is diluted with water and extracted with a suitable organic solvent to remove the diacetone acrylamide. The initial water dilution step is necessary because diacetone acrylamide apparently forms a complex with sulfuric acid during the reaction, and this complex must be broken before the product can be recovered. It has been found that the maximum sulfuric acid concentration permissible in the mixture at the time of extraction is about 80% by weight. Generally, a sulfuric acid concentration of about 25–60% is convenient; this concentration may be attained by adding the reaction mixture to the desired quantity of water, with cooling if necessary to avoid an excessive increase in temperature. In general, the temperature during the dilution step should not exceed about 45° C. and should preferably be below about 30° C.

The organic solvents useful in the extraction method are those which are immiscible with water but in which diacetone acrylamide is highly soluble. While the chemical nature of these solvents is varied, many suitable ones are aromatic hydrocarbons or chlorinated aliphatic hydrocarbons. Examples of these are methylene chloride, chloroform, ethylene dichloride, benzene, toluene and xylene. Chloroform is preferred. The solvent is added to the diluted acid solution in quantities sufficient to dissolve all of the diacetone acrylamide, and is agitated with said solution at a suitable temperature (generally from room temperature to about 50° C.) until extraction is complete. It is then removed from the aqueous phase and the product is recovered therefrom by stripping the solvent, by precipitating with a second liquid in which diacetone acrylamide is insoluble, or by some other suitable means. The sulfuric acid in the aqueous layer may be recovered (e.g., by distillation of the water therefrom) and recycled to the reaction vessel for further use.

It may frequently be advantageous to wash the organic solution with dilute alkali to neutralize whatever acid may remain therein. Also, it is often convenient to dry the organic solution before removing the solvent from the product; such drying may be done by azeotropic distillation where appropriate, or by storage for a suitable period of time in contact with a drying agent.

Acrylamide is one of the byproducts formed in small amounts during the reaction of acrylonitrile with the aldehyde, ketone or self-condensation product thereof. In the method of this invention, nearly all the acrylamide remains in the aqueous layer when chloroform is used for extraction. If an aromatic hydrocarbon such as toluene is used, some of the acrylamide may appear in the organic phase; it may be removed during the alkali wash by heating the mixture at about 50–100° C., thereby hydrolyzing the acrylamide. This method, not claimed herein, is disclosed and claimed in copending application Ser. No. 675,794, filed Oct. 17, 1967.

The method of this invention is illustrated by the following example in which a continuous reaction apparatus is charged with 1900 parts by weight of 93% sulfuric acid and 1397 parts by weight of a mixture of 1380 parts of acetone and 420 parts of acrylonitrile. The mixture passes from the continuous reaction unit into a reaction vessel; the temperature in the continuous unit is 57–64° C. and that of the reaction vessel is 14–20° C.

The reaction mixture in the vessel is heated at 57–60° C. over 2½ hours, and is then transferred to a vessel containing 4200 parts of water at 21–39° C. Chloroform, 1300 parts, is added at 24–27° C., and the mixture is agitated for 20 minutes and allowed to settle. The lower (chloroform) layer is removed and the aqueous layer is further extracted with two successive portions of chloroform (1300 parts each). The combined chloroform solutions are washed with 210 parts of 10% aqueous sodium hydroxide at 27° C., and the chloroform layer is removed and dried. Upon evaporation of the chloroform, there is obtained 743 parts (71.1% of the theoretical amount) of diacetone acrylamide.

What is claimed is:

1. In a method for the preparation of N-(1,1-dimethyl-3-oxobutyl)acrylamide which comprises reacting one mole of acrylonitrile with at least 1 mole of diacetone alcohol or mesityl oxide or with at least 2 moles of acetone in the presence of at least one mole of sulfuric acid, the improvement which consists of diluting the reaction mixture with water to a sulfuric acid content of 25–80% by weight and extracting the N-(1,1-dimethyl-3-oxobutyl)acrylamide from the acidic reaction with a water-immiscible organic solvent, and recovering the N-(1,1-dimethyl-3-oxobutyl)acrylamide from the solution.

2. The method of claim 1 wherein the reaction mixture is diluted with water to a sulfuric acid content of about 25–60% by weight.

3. The method of claim 1 wherein the organic solvent is an aromatic hydrocarbon or a chlorinated aliphatic hydrocarbon.

4. The method of claim 3 wherein the organic solvent is chloroform.

5. The method of claim 3 wherein the organic extract is washed with dilute alkali prior to the recovery of the N-(1,1-dimethyl-3-oxobutyl)acrylamide therefrom.

References Cited

UNITED STATES PATENTS

| | | | |
|---|---|---|---|
| 3,277,056 | 10/1966 | Coleman | 260—561 XR |
| 3,425,942 | 2/1969 | Coleman | 260—561 XR |

ALEX MAZELL, Primary Examiner

J. A. NARCAVAGE, Assistant Examiner